B. NOACK.
VELOCIPEDE HANDLE BAR.
APPLICATION FILED JULY 6, 1912.
1,068,158.
Patented July 22, 1913.
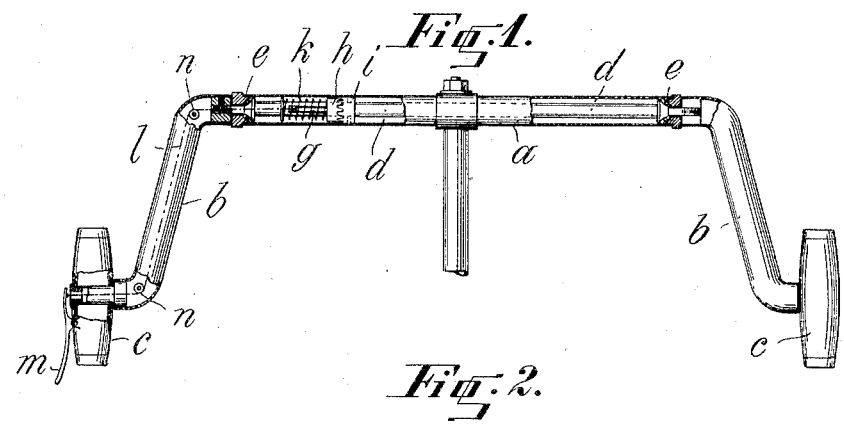
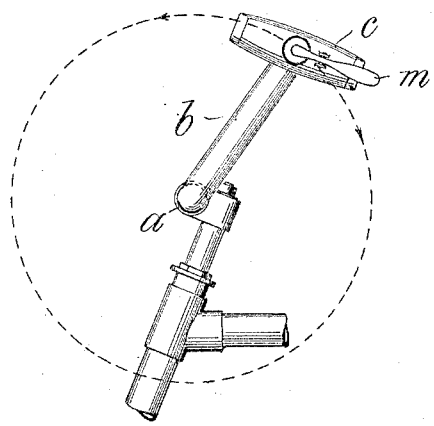
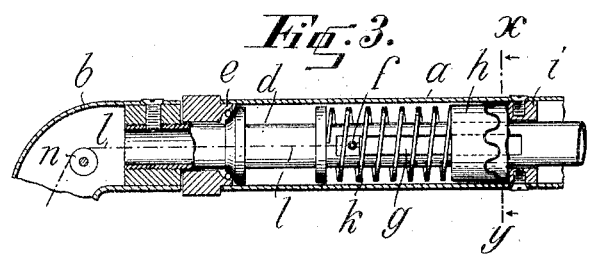 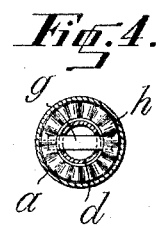
Witnesses
G. H. Baker
J. W. Shepard
Inventor
Bernhard Noack
by Shkinsker & Edmonston
Attorneys

UNITED STATES PATENT OFFICE.

BERNHARD NOACK, OF FURSTENWALDE-ON-THE-SPREE, GERMANY.

VELOCIPEDE HANDLE-BAR.

1,068,158.  Specification of Letters Patent.  Patented July 22, 1913.

Application filed July 6, 1912.  Serial No. 707,980.

*To all whom it may concern:*

Be it known that I, BERNHARD NOACK, of Viktoriastrasse 33, Furstenwalde-on-the-Spree, Germany, have invented a new and useful Improvement in Velocipede Handle-Bars, of which the following is a specification.

The object of this invention is a handle bar for velocipedes which can be adjusted while in use, by simple pressure, and is automatically locked in the position in which it is adjusted.

One form of construction of the device which I provide for this purpose is illustrated in the accompanying drawings, in which—

Figure 1 is a front view of the handle-bar, partly in section, and Fig. 2 a side view thereof. Fig. 3 is a longitudinal section of part of the bar, drawn to a larger scale, and Fig. 4 is a cross-section on the line $x$—$y$ of Fig. 3 viewed from the right-hand side.

The handle bar comprises a center tubular member $a$ and two arms $b$ which project angularly from the ends of the member $a$, to which they are connected by swivel joints, the handles $c$ being rotatably mounted on the arms $b$. A spindle $d$ mounted in ball bearings $e$ in the member $a$ connects the arms $b$ to each other, the arms being fixed to the ends of the spindle. The spindle $d$ has a slot $f$ forming a guide for a slidable block $g$ fixed to a dog-clutch member $h$ mounted on the spindle, the clutch-member $h$ being adapted to coact with a clutch-member $i$ which is fixed by screws inside the member $a$. The clutch member $h$ is engaged with the spindle by the block $g$ so that it can slide axially but cannot rotate independently of the spindle. A powerful spring $k$ tends to hold the clutch member $h$ in engagement with the member $i$, so that the arms are fixed in relation to the member $a$. The block $g$ is connected by a wire $l$ to a lever $m$ pivoted to one of the handles, so that by pressing the lever the cyclist can unclutch the spindle, which enables him to alter the adjustment of the arms $b$ in relation to the member $a$. The arms $b$ can perform a complete revolution about the axis of the member $a$, as indicated by the dotted line in Fig. 2, the rotation taking place in either direction. Release of the lever $m$ enables the spring $k$ to throw the clutch into gear again, whereby the arms $b$ are locked in the new position to which they have been moved. The number of possible adjustments for the arms $b$ depends on the number of dogs on the clutch. If there are twelve dogs, twelve adjustments are possible, the several consecutive positions being 30° apart.

The wire or cable $l$ works on rollers $n$, and is attached to the block $g$ and lever $m$ in such manner that the wire is not twisted during the rotation of the arms $b$.

The adjusting device described does not detract from the strength of the handle bar, or interfere with the provision of the brake or other attachments.

Having now particularly described and ascertained the nature of my said invention and in what manner the same is to be performed, I declare that what I claim is:—

1. A velocipede handle bar comprising a tubular central section and two end sections which project angularly from the ends of said central section, said end sections being fixed to a spindle rotatable in said central section, with an automatic clutch for locking said spindle to said central section, and manually actuatable means for disengaging said clutch.

2. A velocipede handle bar comprising a tubular central section, and two end sections which project angularly from the ends of the said central section, a shaft within the central tubular section and secured at its ends to the end sections, a clutch for locking said shaft to the central section, said clutch comprising one member keyed to the shaft but slidably mounted thereon with the other member secured within the central tubular section.

3. A handle bar for bicycles, velocipedes and the like comprising a central tubular member, a shaft rotatably mounted within the tubular member with its ends projecting beyond the ends of the tubular member, end sections secured to the projecting ends of the shaft, and means for adjusting the end sections angularly with respect to the central tubular member.

4. A handle bar for velocipedes, bicycles, and the like, comprising a central member, end sections swingingly mounted with respect to the central member, a clutch member fixed to the central member, and a movable clutch member carried by the end sections for coöperation with the clutch member secured to the central member for locking the end sections against movement.

5. In a handle bar for velocipedes, bicycles and the like, a central section, end sections, means for swingingly supporting the end sections from the central section, a clutch composed of two clutch members, one of said clutch members being supported by the central section and the other of said clutch member being mounted on the supporting means for the end sections, and means for operating one of the clutch members.

6. A handle bar for velocipedes, bicycles and the like, comprising a central tubular member, a shaft rotatably mounted within the tubular member with its ends projecting beyond the ends of the tubular member, end sections keyed to the projecting ends of the shaft, and means for locking the shaft against rotation.

7. A handle bar for velocipedes, bicycles and the like, comprising a central tubular member provided with bearings at each end, a shaft rotatably mounted within the tubular member and supported by the bearings, said shaft having its ends projecting beyond the ends of the tubular member, end sections provided with hand-grips keyed to the projecting ends of the rotatable shaft, means for locking the shaft against rotation, and means for disengaging the locking means.

8. A velocipede handle bar comprising a tubular central section and two end sections which project angularly with respect to the central section, a shaft rotatably mounted within the central section and secured at its ends to the end sections, a stationary clutch member secured to the tubular central section, a slidable clutch member keyed on the shaft for engagement with the stationary clutch member, a spring bearing against the slidable clutch member for engaging said slidable clutch member with the stationary clutch member, and manually operated means acting against the tension of the spring for disengaging the clutch members.

9. A velocipede handle bar comprising a tubular central section, a shaft rotatably mounted within the central section, end sections secured to the shaft, said end sections carrying hand-grips, an automatic clutch for locking said shaft against rotation, and manually controlled means mounted on one of the hand-grips for operating the clutch.

In testimony whereof, I affix my signature in presence of two witnesses.

BERNHARD NOACK.

Witnesses:
HENRY HASPER,
WOLDEMAR HAUPT.

---

Copies of this patent may be obtained for five cents each, by addressing the "Commissioner of Patents, Washington, D. C."